United States Patent
Matsuda

(10) Patent No.: US 8,919,482 B2
(45) Date of Patent: Dec. 30, 2014

(54) ELECTRIC MOTORCYCLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/997,982

(22) PCT Filed: Dec. 27, 2010

(86) PCT No.: PCT/JP2010/007563
§ 371 (c)(1),
(2), (4) Date: Jun. 25, 2013

(87) PCT Pub. No.: WO2012/090243
PCT Pub. Date: Jul. 5, 2012

(65) Prior Publication Data
US 2013/0292198 A1    Nov. 7, 2013

(51) Int. Cl.
*B62K 11/02* (2006.01)
*B62K 11/04* (2006.01)
*B62K 25/28* (2006.01)

(52) U.S. Cl.
CPC ............. *B62K 11/02* (2013.01); *B62K 11/04* (2013.01); *B62K 25/283* (2013.01); *B62K 2204/00* (2013.01); *B62K 2208/00* (2013.01)
USPC ........................................ 180/220; 180/227

(58) Field of Classification Search
CPC .. B62K 25/283; B62K 11/02; B62K 2204/00; B62K 2208/00; B62K 11/04
USPC .......................................... 180/65.3, 220, 227
See application file for complete search history.

(56) References Cited

U.S. PATENT DOCUMENTS

| 7,017,694 | B2 * | 3/2006 | Shirazawa ................. 180/65.51 |
| 2007/0102218 | A1 * | 5/2007 | Ishii ............................... 180/227 |
| 2011/0061960 | A1 * | 3/2011 | Matsuoka et al. ............ 180/220 |

FOREIGN PATENT DOCUMENTS

| JP | 09071284 A | 3/1997 |
| JP | 2000038183 A | 2/2000 |
| JP | 2003182669 A | 7/2003 |
| JP | 2004026023 A | 1/2004 |
| JP | 2004210074 A | 7/2004 |
| JP | 2009073411 A | 4/2009 |

OTHER PUBLICATIONS

Japanese Patent Office, International Search Report of PCT/JP2010/007563, WIPO, Apr. 12, 2011, 2 pages.

* cited by examiner

*Primary Examiner* — Joseph Rocca
*Assistant Examiner* — Jacob Knutson
(74) *Attorney, Agent, or Firm* — Alleman Hall McCoy Russell & Tuttle LLP

(57) ABSTRACT

An electric motorcycle for driving a rear wheel by driving power generated by an electric motor, comprises a vehicle body frame; a swing arm which extends substantially in a forward and rearward direction, is coupled at a front end portion thereof to the vehicle body frame such that the swing arm is pivotable around the front end portion, and supports the rear wheel at a rear end portion thereof such that the rear wheel is rotatable; a rear suspension coupled to the swing arm and to the vehicle body frame such that the rear suspension is positioned between the swing arm and the vehicle body frame; wherein the rear suspension is placed below a pivot at the front end portion of the swing arm.

9 Claims, 4 Drawing Sheets

ELECTRIC MOTORCYCLE

TECHNICAL FIELD

The present invention relates to an electric motorcycle which activates an electric motor by electric power supplied from a battery, to cause the electric motor to generate driving power.

BACKGROUND ART

In recent years, for the purpose of environmental protection, etc., an electric motorcycle incorporating as a driving power source an electric motor activated by electric energy stored in a battery has been developed (see e.g., Patent Literature 1). Since such an electric motorcycle does not incorporate an engine, devices required for the engine, such as intake and exhaust systems are not necessary.

CITATION LIST

Patent Literature

Patent Literature 1: Japanese-Laid Open Patent Application Publication No. 2009-73411

SUMMARY OF INVENTION

Technical Problem

In a motorcycle incorporating an engine, an exhaust system is typically placed below a swing arm. Because of this, a rear suspension for a rear wheel extends upward from the swing arm. This makes a center of gravity of the vehicle higher, and causes a need for a space in which the suspension is placed, above the swing arm. Especially, in an electric motorcycle, the size of the battery is great, which tends to make the center of gravity of the vehicle higher.

An object of the present invention is to lower a center of gravity of a vehicle, and to ensure a space in which component(s) other than a swing arm is/are placed above the swing arm.

Solution To Problem

The present invention has been made under the above stated circumstances, and an electric motorcycle of the present invention is an electric motorcycle for driving a rear wheel by driving power generated by an electric motor, which comprises a vehicle body frame; a swing arm which extends substantially in a forward and rearward direction is coupled at a front end portion thereof to the vehicle body frame such that the swing arm is pivotable around the front end portion, and supports the rear wheel at a rear end portion thereof such that the rear wheel is rotatable; and a rear suspension coupled to the swing arm and to the vehicle body frame such that the rear suspension is positioned between the swing arm and the vehicle body frame; wherein the rear suspension is placed below a pivot at the front end portion of the swing arm.

In accordance with this configuration, in the electric motorcycle including no exhaust system, the rear suspension can be placed efficiently in the space below the swing arm. Thus, a center of gravity of the electric motorcycle can be lowered, and a space in which another component is placed can be formed above the swing arm.

A rear end portion of the rear suspension may be coupled to the swing arm, a front end portion of the rear suspension may be coupled to the vehicle body frame; and a front end portion of the rear suspension may be placed below the pivot at the front end portion of the swing arm.

In accordance with this configuration, the rear suspension is inclined such that its front is lower than its rear, and the front end portion of the rear suspension is lower than the pivot of the swing arm. Therefore, the center of gravity of the electric motorcycle can be further lowered while ensuring a space in which another component is placed.

The vehicle body frame may include a head pipe supporting a steering shaft; a main frame member extending rearward from the head pipe; and a motor unit case fastened to the main frame member and including a motor accommodating section accommodating the electric motor; an output shaft of the electric motor may be positioned below the pivot at the front end portion of the swing arm; and a front end portion of the rear suspension may be coupled to the motor unit case in a location below the output shaft of the electric motor.

In accordance with this configuration, since the output shaft of the electric motor is positioned below the pivot of the swing arm, and the front end portion of the rear suspension is positioned below the output shaft of the electric motor, the center of gravity of the electric motorcycle can be lowered, and the motor unit case can be placed without interfering with the rear suspension.

The motor accommodating section may include a body having a frame fastening section fastened to a frame member of the vehicle body frame which is different from the motor unit case, and a protruding portion protruding in one direction in a vehicle width direction, from the body; and the rear suspension may be coupled to the body.

In accordance with this configuration, a load applied from the rear suspension to the motor unit case is less likely to be transmitted to the protruding portion protruding in a cantilever manner in the motor accommodating section. This makes it possible to prevent a twisting force or the like from being exerted on the electric motor accommodated in the motor accommodating section.

The swing arm may be provided with a bracket protruding downward; and the rear suspension may be coupled to the bracket.

In accordance with this configuration, the rear suspension can be placed in a lower location with a desired attitude, and hence design flexibility can be improved.

The electric motorcycle may further comprise a transmission which changes a speed of rotational power transmitted from the output shaft of the electric motor and transmits the rotational power to the rear wheel; the output shaft of the electric motor may be placed forward relative to and below an output shaft of the transmission; and the front end portion of the rear suspension may be placed behind the output shaft of the electric motor and below the output shaft of the transmission.

In accordance with this configuration, the space can be provided above the front end portion of the rear suspension, and interference between the rear suspension and the transmission can be prevented easily.

The rear suspension may be placed to be deviated in the vehicle width direction with respect to the transmission.

In accordance with this configuration, the interference between the rear suspension and the transmission can be prevented easily, while placing the rear suspension and the transmission closer to each other.

The rear suspension may be placed on a center line in the vehicle width direction when viewed from above.

In accordance with this configuration, even when the rear suspension is placed in a lower location to lower the center of gravity of the electric motorcycle, an adequate bank angle of the electric motorcycle can be ensured.

The electric motorcycle may further comprise a battery for supplying electric power to the electric motor; and a charging connector for charging the battery with electric power supplied from an outside electric power supply; wherein the charging connector may be placed above the swing arm.

In accordance with this configuration, since the charging connector is placed in the space above the swing arm, which space is formed by placing the rear suspension below the swing arm, the charging connector can be placed in a vertical position where a charging operation can be easily carried out.

Advantageous Effects of the Invention

As should be clearly appreciated from the foregoing, in accordance with the present invention, a center of gravity of an electric motorcycle can be lowered, and a space in which a component other than the swing arm is placed can be formed above the swing arm.

DESCRIPTION OF EMBODIMENTS

Hereinafter, embodiments of the present invention will be described with reference to the drawings. The stated directions are from the perspective of a driver straddling an electric motorcycle.

(Embodiment 1)

Figure 1:
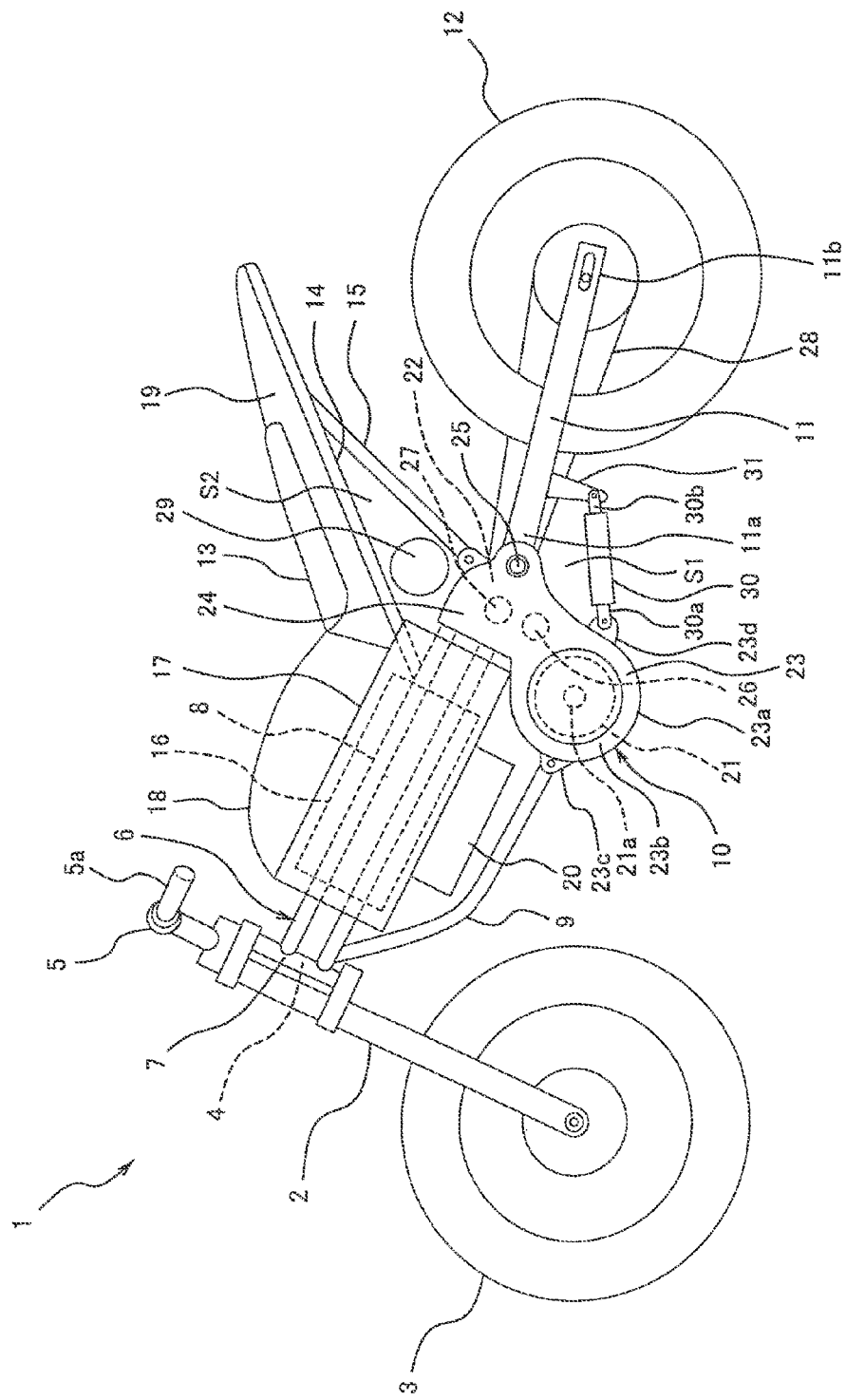
FIG. 1 is a left side view of an electric motorcycle according to Embodiment 1 of the present invention.
Figure 2:
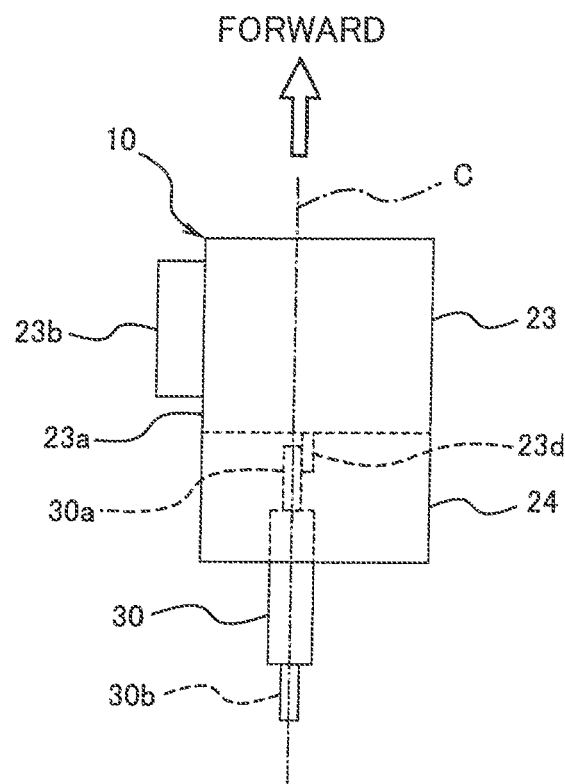
FIG. 2 is a plan view of major components, showing a motor unit case and a rear suspension of the electric motorcycle of FIG. 1, when viewed from above.

FIG. 1 is a left side view of an electric motorcycle 1 according to the embodiment of the present invention. FIG. 2 is a plan view of major components, showing a motor unit case 10 and a rear suspension 30 of the electric motorcycle 1 of FIG. 1, when viewed from above. As shown in FIG. 1, the electric motorcycle 1 does not include an internal combustion engine. The electric motorcycle 1 is configured to rotate a rear wheel 12 by driving power generated by an electric motor 21, thereby driving. The electric motorcycle 1 includes a front fork 2 extending substantially vertically with a predetermined caster angle. A front wheel 3 which is a driven wheel is rotatably mounted to a lower portion of the front fork 2. A lower portion of the steering shaft 4 is coupled to an upper portion of the front fork 2. A bar-type handle 5 including right and left grip members 5a is attached to an upper portion of the steering shaft 4. A portion of the grip member 5a of the handle 5 which is gripped by the driver's right hand is an accelerator grip. The steering shaft 4 is rotatably inserted into the head pipe 7 defining the vehicle body frame 6. The driver rotates the handle 5 to steer the front wheel 3.

The vehicle body frame 6 includes the head pipe 7, and a pair of upper and lower main frame members 8 extending rearward from the head pipe 7 such that they are inclined slightly downward, down frame members 9 extending rearward from the head pipe 7 such that the down frame members 9 are inclined to be lower than the main frame members 8, and a motor unit case 10 (as will be described later) fastened to rear end portions of the main frame members 8 and to rear end portions of the down frame members 9. That is, the motor unit case 10 defines a portion of the vehicle body frame 6. A front end portion 11a of a swing arm 11 extending substantially in a forward and rearward direction is attached to the motor unit case 10 via a pivot 25 such that the swing arm 11 is pivotable around the pivot 25. A rear wheel 12 which is a drive wheel is rotatably mounted to a rear end portion 11b of the swing arm 11. A front end portion of a seat frame member 14 supporting a seat 13 which is straddled by the driver or the like is fastened to the main frame members 8. A front end portion of a support frame member 15 supporting the seat frame member 14 from below is fastened to the motor unit case 10. A rear end portion of the support frame member 15 is fastened to the seat frame member 14. The support frame member 15 is inclined with an angle such that the support frame member 15 is away from the seat frame member 14 to be lower than the seat frame member 14 in a forward direction.

A battery case 17 for accommodating a battery 16 is mounted to the main frame members 8. The battery case 17 has a substantially parallelepiped shape and is placed such that the battery case 17 overlaps with the main frame members 8 when viewed from side. An inverter 20 is mounted to a lower surface of the battery case 17. A storage box 18 for accommodating an article or the like is provided at an upper side of the battery case 17. The seat 13 is placed behind the storage box 18. A cover 19 is provided to extend from an underside of the seat 13 to a rearward side of the seat 13.

The motor unit case 10 includes a motor accommodating section 23 for accommodating the electric motor 21 for driving the electric motorcycle 1, and a transmission accommodating section 24 for accommodating a transmission 22 such that the motor accommodating section 23 and the transmission accommodating section 24 have a unitary construction. The motor accommodating section 23 includes a body 23a having a frame fastening section 23c fastened to the down frame members 9, and a protruding portion 23b protruding in one direction in a vehicle width direction from the body 23a. The electric motor 21 is placed such that an output shaft 21a thereof is oriented in the vehicle width direction. The protruding portion 23b is provided with a bearing (not shown) supporting the output shaft 21a of the electric motor 21 such that the output shaft 21a is rotatable. The output shaft 21a of the electric motor 21 is positioned below the pivot 25 at the front end portion 11a of the swing arm 11.

The transmission accommodating section 24 protrudes rearward and upward from the motor accommodating section 23. A space S1 is formed below the transmission accommodating section 24 and behind the motor accommodating section 23. Rear end portions of the main frame members 8 are fastened to a front portion of the transmission accommodating section 24. The front end portion 11a of the swing arm 11 is coupled to a rear portion of the transmission accommodating section 24 via the pivot 25 such that the swing arm 11 is pivotable around the pivot 25. The transmission 22 accommodated into the transmission accommodating section 24 includes an input shaft 26 to which rotational power is transmitted from the output shaft 21a of the electric motor 21 via a gear (not shown), and an output shaft 27 to which the rotational power is transmitted from the input shaft 26 via a transmission gear selected from a plurality of transmission gears (not shown). The output shaft 27 of the transmission 22 is placed forward relative to the pivot 25, while the input shaft 26 of the transmission 22 is placed forward relative to and below the output shaft 27. The output shaft 21a of the electric motor 21 is placed forward relative to and below the input shaft 26 of the transmission 22. The rotational power of the output shaft 27 of the transmission 22 is transmitted to the rear wheel 12 via a chain 28.

A front end portion of the support frame member 15 is fastened to a portion of the transmission accommodating section 24 which portion is present above the pivot 25. The seat frame member 14, the support frame member 15 and the motor unit case 10 define a space S2 of a substantially triangular shape when viewed from the side. A quick charging connector 29 for charging the battery 16 with electric power supplied from an outside electric power supply (not shown) is placed in the space S2. In other words, the quick charging connector 29 is placed above the motor unit case 10 and the swing arm 11. The electric power charged into the battery 16 by the quick charging connector 29 is supplied to the electric motor 21 via the inverter 20. Thereby, the electric motor 21 generates the driving power for driving the rear wheel 12.

A rear suspension 30 is coupled to the motor unit case 10 and to the swing arm 11 such that the rear suspension 30 is positioned between the motor unit case 10 and the swing arm 11. The rear suspension 30 is entirely placed below the pivot 25 at the front end portion 11a of the swing arm 11. The rear suspension 30 is placed to extend substantially horizontally such that it is inclined slightly upward in a rearward direction, in a stopped state of the electric motorcycle 1. A suspension mounting member 23d is provided on a rear surface of the body 23a of the motor accommodating section 23 of the motor unit case 10. A front end portion 30a of the rear suspension 30 is coupled to the suspension mounting member 23d. The front end portion 30a of the rear suspension 30 is positioned behind and below the output shaft 21a of the electric motor 21, below the output shaft 27 of the transmission 22, and forward relative to and below the pivot 25.

A bracket 31 protruding downward in front of the rear wheel 12 is fastened to a cross member (not shown) of the swing arm 11. A rear end portion 30b of the rear suspension 30 is coupled to a lower end portion of the bracket 31. The rear suspension 30 is placed on a center line C in the vehicle width direction (see FIG. 2). The transmission accommodating section 24 of the motor unit case 10 is positioned above the rear suspension 30. Since the transmission accommodating section 24 is configured to protrude upward and rearward from the motor accommodating section 23, the space S1 vertically expanding in a rearward direction is formed between a portion of the motor unit case 10, which portion is placed above the rear suspension 30, and the rear suspension 30.

In accordance with the configuration as described above, in the electric motorcycle 1 which includes no exhaust system, the rear suspension 30 can be placed efficiently in the space below the swing arm 11. Thus, the center of gravity of the electric motorcycle 1 can be lowered, and the space in which another component such as the quick charging connector 29 is placed can be formed above the swing arm 11. In addition, the rear suspension 30 extends in the forward and rearward direction in a substantially horizontal state such that its front is slightly lower than its rear. In this layout, the rear suspension 30 can be placed so as not to interfere with another component, and the center of gravity of the electric motorcycle 1 can be lowered. Since the output shaft 21a of the electric motor 21 is positioned below the pivot shaft 25 of the swing arm 11 and the front end portion 30a of the rear suspension 30 is positioned below the output shaft 21a of the electric motor 21, the motor unit case 10 can be placed without interfering with the rear suspension 30.

Since the rear suspension 30 is coupled to the bracket 31 protruding downward from the swing arm 11, the rear suspension 30 can be placed in a lower location with a desired attitude, thus improving design flexibility. Since the rear suspension 30 is coupled to the body 23a of the motor unit case 10, a load applied from the rear suspension 30 to the motor unit case 10 is less likely to be transmitted to the protruding portion 23b protruding in a cantilever manner in the motor accommodating section 23. This makes it possible to prevent a twisting force or the like from being exerted on the electric motor 21 accommodated in the motor accommodating section 23.

The transmission accommodating section 24 protrudes upward and rearward from the motor accommodating section 23, the output shaft 21a of the electric motor 21 is placed forward relative to and below the output shaft 27 of the transmission 22, and the front end portion 30a of the rear suspension 30 is placed behind the output shaft 21a of the electric motor 21 and below the output shaft 27 of the transmission 22. In this layout, the space S1 having an adequate dimension is formed between the rear suspension 30 and the motor unit case 10, which can prevent the rear suspension 30 from interfering with the motor unit case 10 even when the swing arm 11 is pivoted to a great degree. In addition, the rear suspension 30 is placed on the center line C in the vehicle width direction when viewed from above. Because of this, even when the rear suspension 30 is placed in a lower position to lower the center of gravity of the electric motorcycle 1, an adequate bank angle of the electric motorcycle 1 can be ensured during cornering.

Since the motor accommodating section 23 is placed above the rear suspension 30, the rear suspension 30 can be protected from forward by the motor accommodating section 23, against obstacles such as unevenness of a road surface, stones, etc. Since the front end portion 30a of the rear suspension 30 is coupled to the motor accommodating section 23 positioned forward relative to the pivot 25 of the swing arm 11, the length of the rear suspension 30 can be increased. Since the bracket 31 protrudes downward from the cross member of the swing arm 11, a supporting stiffness of the rear suspension 30 can be enhanced.

(Embodiment 2)

Figure 3:
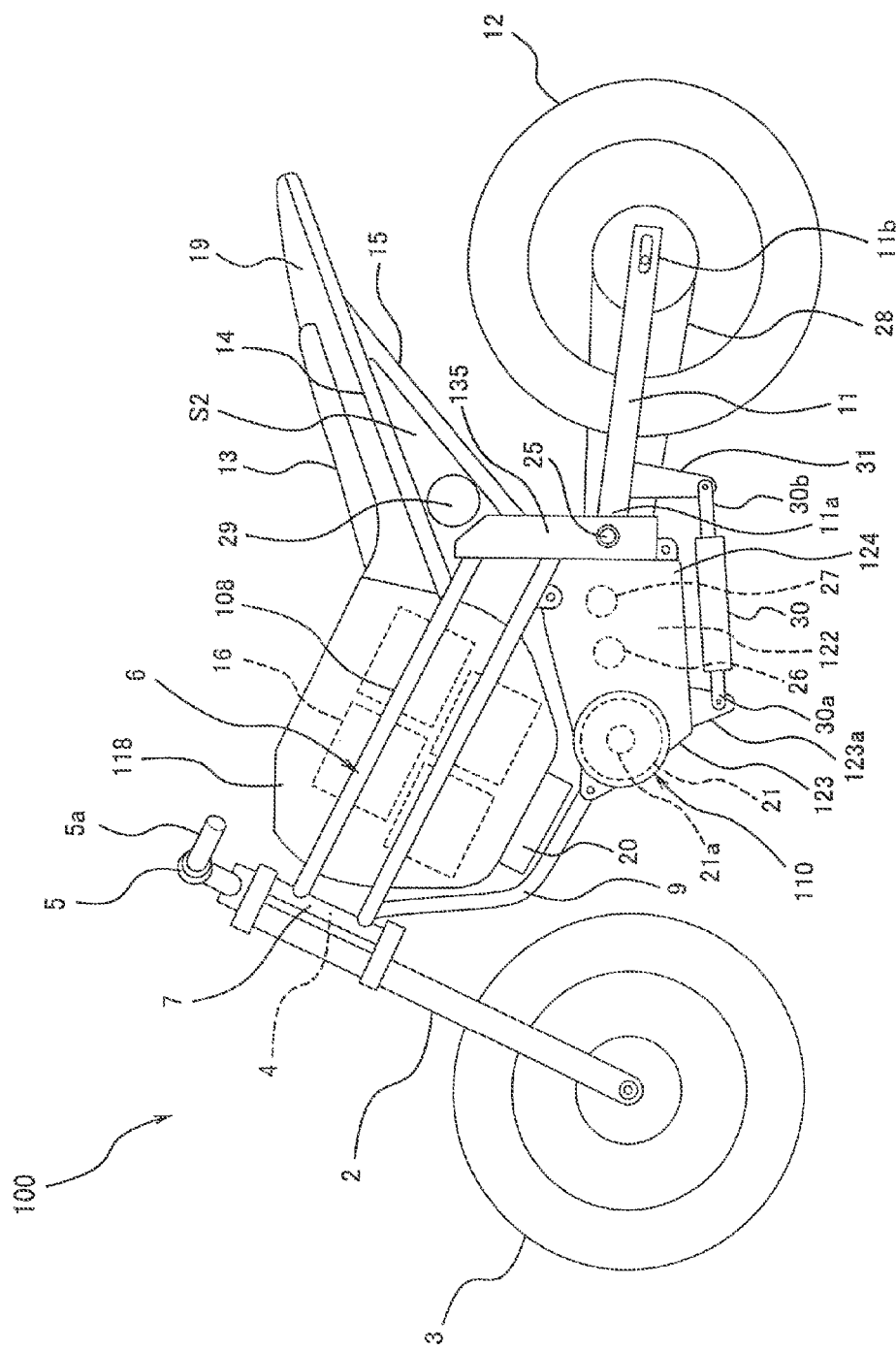
FIG. 3 is a left side view showing a region surrounding a rear suspension of an electric motorcycle according to Embodiment 2 of the present invention.
Figure 4:
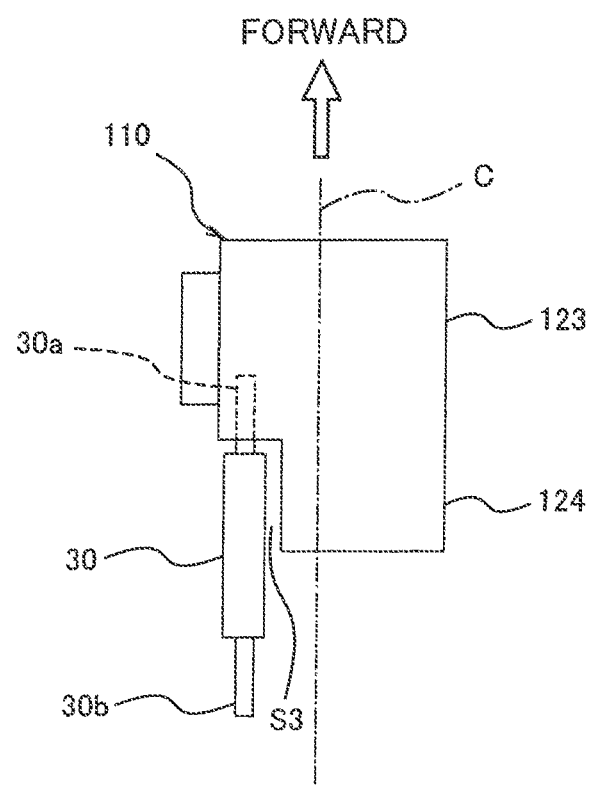
FIG. 4 is a plan view of major components, showing a motor unit case and the rear suspension of the electric motorcycle of FIG. 3, when viewed from above.

FIG. 3 is a left side view showing a region surrounding the rear suspension 30 of an electric motorcycle 100 according to Embodiment 2 of the present invention. FIG. 4 is a plan view of major components, showing a motor unit case 110 and the rear suspension 30 of the electric motorcycle 100 of FIG. 3, when viewed from above. The same components as those of Embodiment 1 are identified by the same reference symbols and will not be described in repetition. As shown in FIGS. 3 and 4, in the electric motorcycle 100 of the present embodiment, a battery case 118 accommodating the battery 16 is mounted to a pair of right and left main frame members 108 and a pair of upper and lower main frame members 108 extending rearward from the head pipe 7, pivot frame members 135 are fastened to rear end portions of the main frame members 108, and the front end portion 11a of the swing arm 11 is coupled to the pivot frame member 135 via the pivot 25.

The motor unit case 110 is fastened to the main frame members 108, the down frame members 9 and the pivot frame member 135. The motor unit case 110 includes a motor accommodating section 123 accommodating the electric motor 21, and a transmission accommodating section 124 provided behind the motor accommodating section 123 to accommodate a transmission 122 such that the motor accommodating section 123 and the transmission accommodating section 124 have a unitary construction. A lower surface of the motor accommodating section 123 and a lower surface of the transmission accommodating section 124 are substantially flat. The transmission accommodating section 124 has a smaller width in the vehicle width direction than the motor accommodating section 123. A space S3 is formed laterally relative to the transmission accommodating section 124 and behind the motor accommodating section 123

A suspension mounting member 123a protrudes downward from the lower surface of the motor accommodating section 123. The front end portion 30a of the rear suspension 30 is coupled to the suspension mounting member 123a. The rear suspension 30 is placed substantially in parallel along the lower surface of the motor unit case 10. The rear suspension 30 is placed to be deviated in the vehicle width direction with respect to the transmission accommodating section 124. That is, the rear suspension 30 is placed to overlap with the space S when viewed from above. In this layout, it becomes possible to easily prevent interference between the rear suspension 30 and the transmission accommodating section 124 while making the rear suspension 30 and the transmission accommodating section 124 close to each other. The other components are identical to those of Embodiment 1, and will not be described in detail.

Although in the above described embodiments, the front end portion 30a of the rear suspension 30 is coupled to the motor unit case 10 or 110 in the vehicle body frame 6, it may be coupled to another frame member (e.g., main frame member 8, 108, etc.) which is below the pivot 25. Although in the above described embodiments, the rear suspension is coupled to a portion of the swing arm and to the frame member such that the rear suspension is positioned between the portion of the swing arm and the frame member, it may be coupled to them via a link member. For example, the rear end portion of the rear suspension may be coupled to the link member coupled to the swing arm such that the link member is angularly displaceable with respect to the swing arm. In the same manner, the front end portion of the rear suspension may be coupled to the main frame member or a frame member integral with the main frame member via a link member such that the rear suspension is angularly displaceable with respect to the main frame member or the frame member. By coupling the rear suspension via the link member in this way, an extension/contraction amount of the rear suspension with respect to a displacement amount of the rear wheel can be changed.

Although in the above described embodiments, the rear suspension is placed horizontally or such that its front is slightly lower than its rear, it may be placed such that its front is higher than its rear. Although in the above described embodiments, the rear end portion of the rear suspension is placed forward relative to the rear wheel, it may be placed behind the front end portion of the rear wheel. This can increase the length of the rear suspension. Alternatively, rear suspensions may be placed at both sides in the vehicle width direction, instead of the layout in which one suspension is placed. Although in the above described embodiments, the connector is placed above the swing arm, another component, for example, the inverter, the battery, the controller, etc., may be placed there. Since a region above the swing arm is more likely to be surrounded by the frame members, these components can be protected by the frame members. The present invention is not limited to the above described embodiments, but the components in the embodiments may be changed, added or deleted within a spirit of the present invention. Moreover, the above described embodiments may be combined as desired. For example, a portion of the components or a method in one embodiment may be applied to another embodiment.

Industrial Applicability

As described above, the present invention has advantages that a center of gravity of a vehicle can be lowered, and a space in which a component other than a swing arm is placed can be formed above the swing arm, and is widely and effectively applicable to electric motorcycles which can attain the advantages.

Reference Characters List 1, 100 electric motorcycle
6 vehicle body frame
7 head pipe
8, 108 main frame member
10, 110 motor unit case
11 swing arm
21 electric motor
21a output shaft
22 transmission
23, 123 motor accommodating section
23a, 123a body
23b, 123b protruding portion
24, 124 transmission accommodating section
25 pivot
26 input shaft
27 output shaft
29 quick charging connector
30 rear suspension
31 bracket

The invention claimed is:

1. An electric motorcycle, comprising:
   a vehicle body frame which includes a head pipe supporting a steering shaft, and a main frame portion extending rearward from the head pipe such that the main frame portion is inclined downward;
   an electric motor which generates driving power for driving a rear wheel;
   a battery for supplying electric power to the electric motor;
   a battery case which accommodates the battery and is placed such that the battery case overlaps with the main frame portion when viewed from a side;
   a swing arm which extends substantially in a forward and rearward direction is coupled at a front end portion thereof to the vehicle body frame such that the swing arm is pivotable around the front end portion, and supports the rear wheel at a rear end portion thereof such that the rear wheel is rotatable; and
   a rear suspension coupled to the swing arm and to the vehicle body frame such that the rear suspension is positioned between the swing arm and the vehicle body frame;
   wherein the rear suspension is placed below a pivot at the front end portion of the swing arm, and a front end portion of the rear suspension is positioned forward relative to and below the pivot;
   wherein an output shaft of the electric motor is positioned forward relative to and below the pivot.

2. The electric motorcycle according to claim 1,
   wherein a rear end portion of the rear suspension is coupled to the swing arm;
   wherein the front end portion of the rear suspension is coupled to the vehicle body frame; and
   wherein the front end portion of the rear suspension is placed below the pivot at the front end portion of the swing arm.

3. The electric motorcycle according to claim 1,
   wherein the swing arm is provided with a bracket protruding downward; and
   wherein the rear suspension is coupled to the bracket.

4. The electric motorcycle according to claim 1,
wherein the rear suspension is placed on a center line in the vehicle width direction when viewed from above.

5. The electric motorcycle according to claim 1, further comprising:
 a battery for supplying electric power to the electric motor; and
 a charging connector for charging the battery with electric power supplied from an outside electric power supply;
 wherein the charging connector is placed above the swing arm.

6. An electric motorcycle for driving a rear wheel by driving power generated by an electric motor, comprising:
 a vehicle body frame;
 a swing arm which extends substantially in a forward and rearward direction is coupled at a front end portion thereof to the vehicle body frame such that the swing arm is pivotable around the front end portion, and supports the rear wheel at a rear end portion thereof such that the rear wheel is rotatable; and
 a rear suspension coupled to the swing arm and to the vehicle body frame such that the rear suspension is positioned between the swing arm and the vehicle body frame;
 wherein the rear suspension is placed below a pivot at the front end portion of the swing arm;
 wherein the vehicle body includes:
 a head pipe supporting a steering shaft;
 a main frame member extending rearward from the head pipe; and
 a motor unit case fastened to the main frame member and including a motor accommodating section accommodating the electric motor;
 wherein an output shaft of the electric motor is positioned below the pivot at the front end portion of the swing arm; and
 wherein a front end portion of the rear suspension is coupled to the motor unit case in a location below the output shaft of the electric motor.

7. The electric motorcycle according to claim 6,
wherein the motor accommodating section includes a body having a frame fastening section fastened to a frame member of the vehicle body frame which is different from the motor unit case, and a protruding portion protruding in one direction in a vehicle width direction from the body; and
 wherein the rear suspension is coupled to the body.

8. An electric motorcycle for driving a rear wheel by driving power generated by an electric motor, comprising:
 a vehicle body frame;
 a swing arm which extends substantially in a forward and rearward direction, is coupled at a front end portion thereof to the vehicle body frame such that the swing arm is pivotable around the front end portion, and supports the rear wheel at a rear end portion thereof such that the rear wheel is rotatable;
 a rear suspension coupled to the swing arm and to the vehicle body frame such that the rear suspension is positioned between the swing arm and the vehicle body frame; and
 a transmission which changes a speed of rotational power transmitted from the output shaft of the electric motor and transmits the rotational power to the rear wheel;
 wherein the rear suspension is placed below a pivot at the front end portion of the swing arm;
 wherein the output shaft of the electric motor is placed forward relative to and below an output shaft of the transmission; and
 wherein a front end portion of the rear suspension is placed behind the output shaft of the electric motor and below the output shaft of the transmission.

9. The electric motorcycle according to claim 8,
wherein the rear suspension is placed to be deviated in a vehicle width direction with respect to the transmission.

* * * * *